(12) United States Patent
Ahn

(10) Patent No.: US 6,480,512 B1
(45) Date of Patent: Nov. 12, 2002

(54) METHOD AND DEVICE FOR CONVERTING BIT RATE OF SERIAL DATA

(75) Inventor: Young-Jin Ahn, Kwangmyong (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/222,682

(22) Filed: Dec. 29, 1998

(30) Foreign Application Priority Data

Dec. 29, 1997 (KR) .............................................. 97 75960

(51) Int. Cl.⁷ .................................................. H04J 3/22
(52) U.S. Cl. ........................ 370/545; 370/466; 370/914; 341/61
(58) Field of Search ................................ 370/465–466, 370/914, 545–546, 366; 341/61

(56) References Cited

U.S. PATENT DOCUMENTS

| | | | | |
|---|---|---|---|---|
| 4,021,616 A | * | 5/1977 | Betts ........................... | 370/545 |
| 4,317,198 A | * | 2/1982 | Johnson ....................... | 370/112 |
| 4,538,286 A | * | 8/1985 | McNesby et al. ........... | 375/112 |
| 5,247,652 A | | 9/1993 | Uda ............................ | 395/500 |
| 5,357,447 A | | 10/1994 | Ichiyoshi .................... | 364/484 |
| 5,359,605 A | | 10/1994 | Urbansky et al. ........... | 370/102 |
| 5,396,598 A | | 3/1995 | Andersen et al. ........... | 395/275 |
| 5,425,062 A | * | 6/1995 | Boop .......................... | 375/377 |
| 5,457,456 A | * | 10/1995 | Norsworthy ................. | 341/61 |
| RE35,254 E | | 5/1996 | Chaisemartin et al. ...... | 377/47 |
| 5,706,438 A | | 1/1998 | Choi ....................... | 395/200.13 |
| 5,923,173 A | * | 7/1999 | Yu .............................. | 324/547 |
| 6,411,245 B2 | * | 6/2002 | Oka ........................... | 341/155 |

* cited by examiner

*Primary Examiner*—Ricky Ngo
*Assistant Examiner*—Tri H. Phan
(74) *Attorney, Agent, or Firm*—Robert E. Bushnell, Esq.

(57) ABSTRACT

A method and device for converting high rate serial data into low rate serial data are disclosed. The device includes: first and second clock application parts for selectively generating a high rate clock and low rate clock according to a selection signal; a first bit rate conversion part for receiving and latching the high rate serial data according to the high rate clock from the first clock application part, and for outputting the latched data at a low rate according to the low rate clock; a second bit rate conversion part for receiving and latching the high rate serial data according to the high rate clock from the second clock application part, and for outputting the latched data at a low rate according to the low rate clock; a first selector for receiving and selectively outputting the output of the first bit rate conversion part and the high rate serial data; a second selector for receiving and selectively outputting the output of the second bit rate conversion part and the high rate serial data; a selection part for controlling outputting of two input signals which are applied to the first and second selectors; and a third selector for receiving the outputs of the first and second bit rate conversion parts, and for sequentially outputting the high rate serial data in accordance with the low rate clock. A corresponding method and device for converting low rate serial data into high rate serial data are also disclosed.

32 Claims, 4 Drawing Sheets

METHOD AND DEVICE FOR CONVERTING BIT RATE OF SERIAL DATA

CLAIM OF PRIORITY

This application makes reference to, incorporates the same herein, and claims all benefits accruing under 35 U.S.C. §119 from an application for DEVICE FOR CONVERTING BIT RATE OF SERIAL DATA earlier filed in the Korean Industrial Property Office on the Dec. 29, 1997 and there duly assigned Serial No. 75960/1997.

BACKGROUND OF THE INVENTION

1. Technical Field

The present invention relates to a method and device for converting a bit rate in a specific system and, in particular, to a method and device for converting a bit rate of serial data.

2. Related Art

In general, when data is transmitted between systems or units in a specific system in an electronic communication system, bit rates in the systems or units may be different from each other. That is, when data is transmitted and received between systems or units of a system which have bit rates different from each other, one side is at a relatively high rate and other side is at a relatively low rate. Accordingly, the relatively low rate unit or system requires a bit rate converter in order to process high rate input data at a low rate. A method for converting the bit rate of data (especially, serial data) employed in current communication systems is explained below. When a low rate unit or system receives high rate serial data, the high rate serial data is converted into parallel data, and this parallel data is latched with a low rate clock having a cycle corresponding to an actual data processing rate and a different phase using a time slot method. The latched data is converted into serial data according to the low rate clock having a cycle corresponding to the actual data processing rate. By doing so, the high rate serial data is converted into low rate serial data. However, when high rate 8-bit serial data is converted into low rate data, there is a time delay corresponding to eight cycles of a processing clock for the high rate data. On the other hand, when low rate 8-bit serial data is converted into high rate serial data via parallel conversion processing, this also produces a time delay corresponding to one cycle of a processing clock for low rate data.

Furthermore, processing of serial data in parallel requires logic for converting serial data into parallel data, logic for converting the parallel data into serial data, and a plurality of flip-flops for latching data when the serial data is converted into parallel data. Specifically, one flip-flop is needed for each bit of data. Accordingly, many components are required to construct the bit rate conversion device. This increases the cost and complicates the logic circuitry.

The following patents are considered to be representative of the prior art, and are burdened by the disadvantages set forth herein: U.S. Pat. No. 4,317,198 to Johnson, entitled Rate converting Bit Stram Demultiplexer And Multiplexer, U.S. Pat. No. 5,247,652 to Uda, entitled parallel To Serial Converter Enabling Operation At A High Bit Rate With Slow Components By Latching Sets Of Pulses Following Sequential Delays Equal To Clock Period, U.S. Pat. No. 5,357,447 to Ichiyoshi, entitled Rate Conversion Apparatus, U.S. Pat. No. 5,359,605 to Urbansky et al., entitled Circuit Arrangement For Adjusting The Bit Rates Of Two Signals, U.S. Pat. No. 5,396,598 to Andersen et al., entitled Event-Driven Signal Processor Interface Having Multiple Paralleled Microprocessor-Controlled Data Processors For Accurately Receiving, Timing And Serially Retransmitting Asynchronous Data With Quickly Variable Data Rates, U.S. Pat. No. 5,706,438 to Choi et al., entitled Data Transmission Device For Transmitting Converted Data At A Controlled Transmission Rate, and U.S. Pat. Re.35,254 to Chaisemartin et al., entitled Conversion Device For Doubling/Dividing The Rate Of A Serial Bit Stream.

SUMMARY OF THE INVENTION

It is, therefore, an object of the present invention to provide a method and device for converting the bit rate of serial data using a small number of logic elements and without processing the data in parallel.

To achieve the above objects, there is provided a method and device for converting high rate serial data into low rate serial data. The device of the present invention includes: first and second clock application parts for selectively generating a high rate clock and a low rate clock according to a selection signal; a first bit rate conversion part for receiving and latching the high rate serial data according to the high rate clock from the first clock application part, and for outputting the latched data at a low rate according to the low rate clock; a second bit rate conversion part for receiving and latching the high rate serial data according to the high rate clock from the second clock application part, and for outputting the latched data at a low rate according to the low rate clock; a first selector for receiving the output of the first bit rate conversion part and the high rate serial data, and for selectively outputting them; a second selector for receiving the output of the second bit rate conversion part and the high rate serial data, and for selectively outputting them; a selection part for controlling outputting of the two input signals applied to the first and second selectors; and a third selector for receiving the outputs of the first and second bit rate conversion parts, and for sequentially outputting the high rate serial data at the low rate clock.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
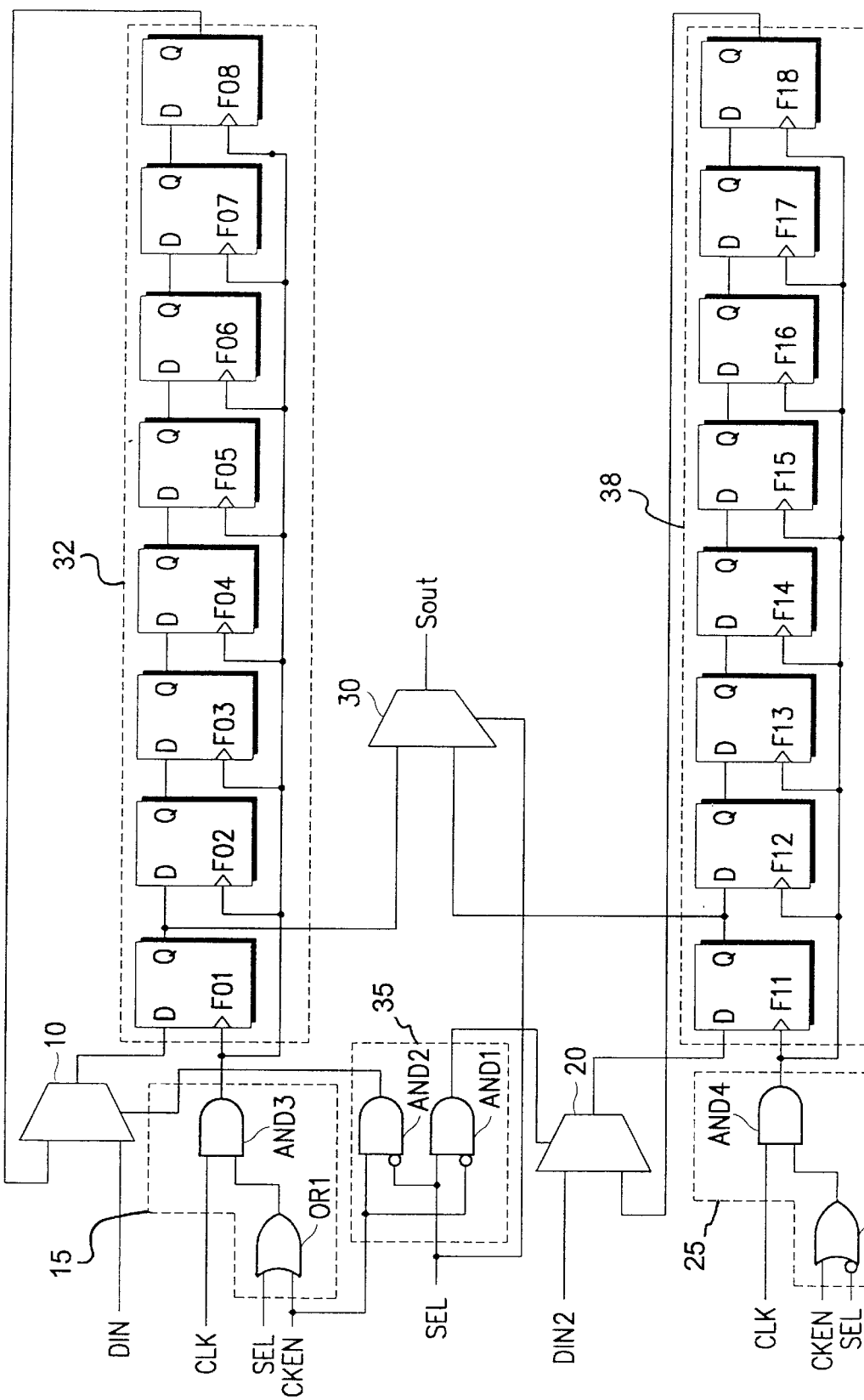
FIG. 1 is a block diagram of a device for converting high rate serial data into low rate serial data according to a preferred embodiment of the present invention.

A preferred embodiment of the present invention will be described in detail with reference to the accompanying drawings, in which the like reference numerals denote the like or equivalent elements. In the specification, well-known functions or constructions which may obscure the invention in unnecessary detail are not described in detail.

FIG. 1 is a block diagram of a device for converting high rate serial data into low rate serial data according to a preferred embodiment of the present invention. In a preferred embodiment of the present invention, it is assumed that high rate input data is 8 Mbit and low rate output data is 2 Mbit. Referring to FIG. 1, a signal inputted into the device for converting high rate serial data includes a signal DIN that is high rate serial data, a clock signal CLK for providing clock to various gates, a selection signal SEL for selecting an output terminal, and a clock enable signal CKEN for enabling various gates. Selection signal SEL and clock enable signal CKEN are applied to a first OR gate OR1 which performs logic-ORing, and the output signal of first OR gate OR1 and clock signal CLK are applied to a third AND gate AND3 which carries out logic-ANDing. The first OR gate OR1 and third AND gate AND3 are referred to as "first clock application part 15" hereinafter. Clock enable signal CKEN is directly applied to a second AND gate AND2, and its inverted signal is applied to a first AND gate AND1. Selection signal SEL is directly applied to first AND gate AND1 and its inverted signal is applied to second AND gate AND2. First AND gate AND1 and second AND gate AND2 are referred to as "selection part 35" hereinafter.

A second OR gate OR2 performing logic-ORing receives clock enable signal CKEN and inverted selection signal SEL, and a fourth AND gate AND4 receives the output signal of second OR gate OR2 and clock signal CLK. Second OR gate OR2 and fourth AND gate AND4 are referred to as "second clock application part 25" hereinafter. The output of the first clock application part 15 is sent to the clock port of each of eight D-flip flops F01, F02, F03, F04, F05, F06, F07 an serially connected, and the output of fourth AND gate AND4 is applied to the clock port of each of eight D-flip flops F11, F12, F13, F14, F15, F16, F17 and F18 serially connected. The eight D-flip flops receiving the clock sent from third AND gate AND3 are referred to as "first bit rate conversion part 32", and the eight D-flip flops receiving the output of the second clock application part 25 to its clock port are referred to as "second bit rate conversion part 38" hereinafter. Here, the serial connection means that the output port of each flip flop is connected to the input port of the following flip flop. For example, the output port of first D-flip flop F01 of the first bit rate conversion part 32 is connected to the input port of second D-flip flop F02, and the output port of the second D-flip flop F02 is connected to the input port of third D-flip flop F03. By doing so, the output port of seventh D-flip flop F07 is connected to the input port of eighth D-flip flop F08, which is the final D-flip flop of the first bit rate conversion part 32.

The input port of first D-flip flop F01 of the first bit rate conversion part 32 is connected to the output port of a first selector 10, and the selection port for selecting one of both inputs of first selector 10 is coupled to the output port of the second AND gate AND2. The first input port of first selector 10 receives the high rate serial data DIN, and its second input port is connected to the output port of the final D-flip flop F08 of the first bit rate conversion part 32. The input port of first D-flip flop F11 of the second bit rate conversion part 38 is coupled to the output port of a second selector 20, and the output port of the final D-flip flop F18 of the second bit rate conversion part 38 is coupled to the second input port of second selector 20. The output port of first AND gate AND 1 is connected to the selection port of second selector 20, which selects one of both inputs of second selector 20, and high rate data DIN 2 is applied to the first input port of second selector 20. The first input port of a third selector 30 is coupled to the output port of first D-flip flop F01 of the first bit rate conversion part 32, and the second input port of third selector 30 is coupled to the output port of first D-flip flop F11 of the second bit rate conversion part 38. Selection signal SEL is applied to the selection port for selecting one of both inputs of third selector 30.

Figure 2:
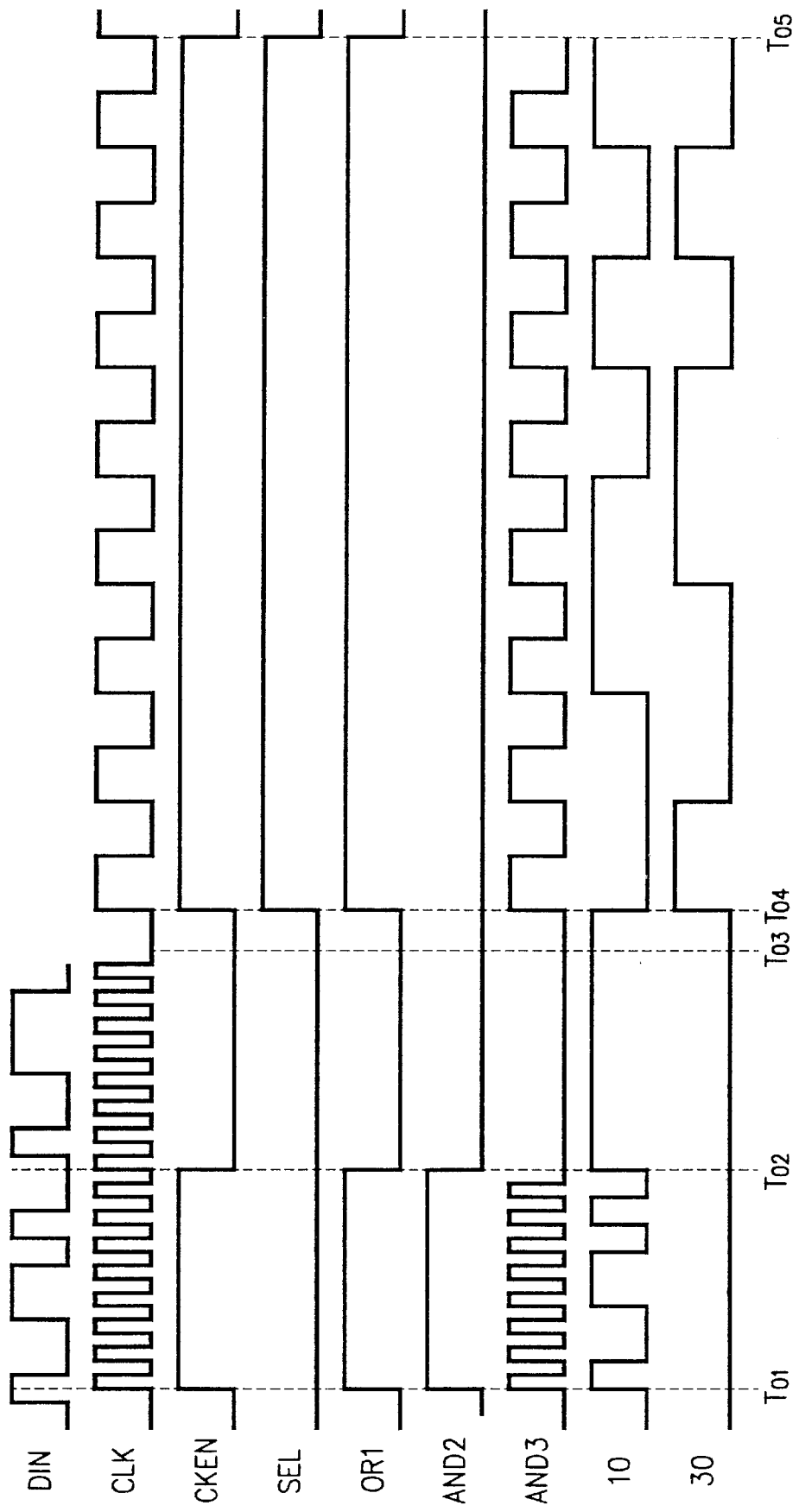
FIG. 2 illustrates the timing of principal parts of the conversion device of FIG. 1 according to the its operation.

The operation of the conversion device of FIG. 1 is described below with reference to FIG. 2. FIG. 2 illustrates the timing of principal parts of the conversion device of FIG. 1 according to the its operation. First of all, the operation will be explained when input data DIN is 8-bit, 10 01 10 10, and all flip flops of the bit rate conversion parts 32 and 38 are in a reset state such that all data is outputted as 0. With clock signal CLK, sixteen cycles of clock with an 8 Mbit rate are applied for a period of time ranging from the point of $T_{01}$ to the point of $T_{03}$, and eight cycles of clock with a 2 Mbit rate are applied for a period of time from the point of $T_{04}$ to the point of $T_{05}$. Clock enable signal CKEN is in a "HIGH" state from the point of $T_{01}$ to the point of $T_{02}$, a "LOW" state from the point of $T_{02}$ to the point of $T_{04}$, and a "HIGH" state from the point of $T_{04}$ to the point of $T_{05}$. Selection signal SEL is initially applied in the "LOW" state and is inverted to the "HIGH" state at the point of $T_{04}$.

Accordingly, the output signal of first OR gate OR1 is in the "HIGH" state for periods of time from $T_{01}$ to $T_{02}$ and from $T_{04}$ to $T_{05}$ because first OR gate OR1 logic-ORs selection signal SEL and clock enable signal CKEN. The output signal of second AND gate AND2 is in the "HIGH" state for a period of time from the point of $T_{01}$ to the point of $T_{02}$. This allows first selector 10 to output the high rate input data DIN which is applied to the second input port of selection 10. Thus, first selector 10 receives input data DIN and outputs data 10 01 10 10, which is identical to the input data. The output signal of third AND gate AND3 is identical to the clock of 8 Mbit rate for a period of time from the point of $T_{01}$ to the point of $T_{02}$ because third AND gate AND3 logic-ANDs the clock signal CLK and output signal of first OR gate OR1, and it is maintained in a "LOW" state for a period of time from the point of $T_{02}$ to the point of $T_{04}$ because the output signal of first OR gate OR1 is applied thereto in the "LOW" state. For a period of time ranging from the point of $T_{04}$ to the point of $T_{05}$, the output signal of third AND gate AND3 is identical to the clock having a 2 Mbit rate. Accordingly, the outputs of each of the flip flops in the first bit rate conversion part 32 are shifted by one bit according to the output signals of third AND gate AND3 and first selector 10. This is shown in the following table.

TABLE 1

| Input clock | F01 | F02 | F03 | F04 | F05 | F06 | F07 | F08 |
|---|---|---|---|---|---|---|---|---|
| Initial state | 0 | 0 | 0 | 0 | 0 | 0 | 0 | 0 |
| 1st clock | 1 | 0 | 0 | 0 | 0 | 0 | 0 | 0 |
| 2nd clock | 0 | 1 | 0 | 0 | 0 | 0 | 0 | 0 |
| 3rd clock | 0 | 0 | 1 | 0 | 0 | 0 | 0 | 0 |
| 4th clock | 1 | 0 | 0 | 1 | 0 | 0 | 0 | 0 |
| 5th clock | 1 | 1 | 0 | 0 | 1 | 0 | 0 | 0 |
| 6th clock | 0 | 1 | 1 | 0 | 0 | 1 | 0 | 0 |
| 7th clock | 1 | 0 | 1 | 1 | 0 | 0 | 1 | 0 |
| 8th clock | 0 | 1 | 0 | 1 | 1 | 0 | 0 | 1 |
| 9th clock | 1 | 0 | 1 | 0 | 1 | 1 | 0 | 0 |
| 10th clock | 0 | 1 | 0 | 1 | 0 | 1 | 1 | 0 |
| 11th clock | 0 | 0 | 1 | 0 | 1 | 0 | 1 | 1 |
| 12th clock | 1 | 0 | 0 | 1 | 0 | 1 | 0 | 1 |
| 13th clock | 1 | 1 | 0 | 0 | 1 | 0 | 1 | 0 |

TABLE 1-continued

| Input clock | F01 | F02 | F03 | F04 | F05 | F06 | F07 | F08 |
|---|---|---|---|---|---|---|---|---|
| 14th clock | 0 | 1 | 1 | 0 | 0 | 1 | 0 | 1 |
| 15th clock | 1 | 0 | 1 | 1 | 0 | 0 | 1 | 0 |
| 16th clock | 0 | 1 | 0 | 1 | 1 | 0 | 0 | 1 |

As described in Table 1, the outputs of the flip flops of the first bit rate conversion part 32 are shifted by one bit according to the input clock, the first clock to eighth clock being 8 Mbit high rate clocks, the ninth clock to sixteenth clock being 2 Mbit low clocks. Third selector 30 outputs the output signal of first D-flip flop F01 of the first bit rate conversion part 32 from the point of $T_{04}$ at which selection signal SEL is converted to the "HIGH" state. Thus, the output of third selector 30 is identical to the first output signal of the first bit rate conversion part 32 at the point in time at which the ninth clock is applied. This can be known from the output of third selector 30 shown in FIG. 2. The output signal of the second bit rate conversion part can be also outputted from third selector 30 as described above.

Figure 3:
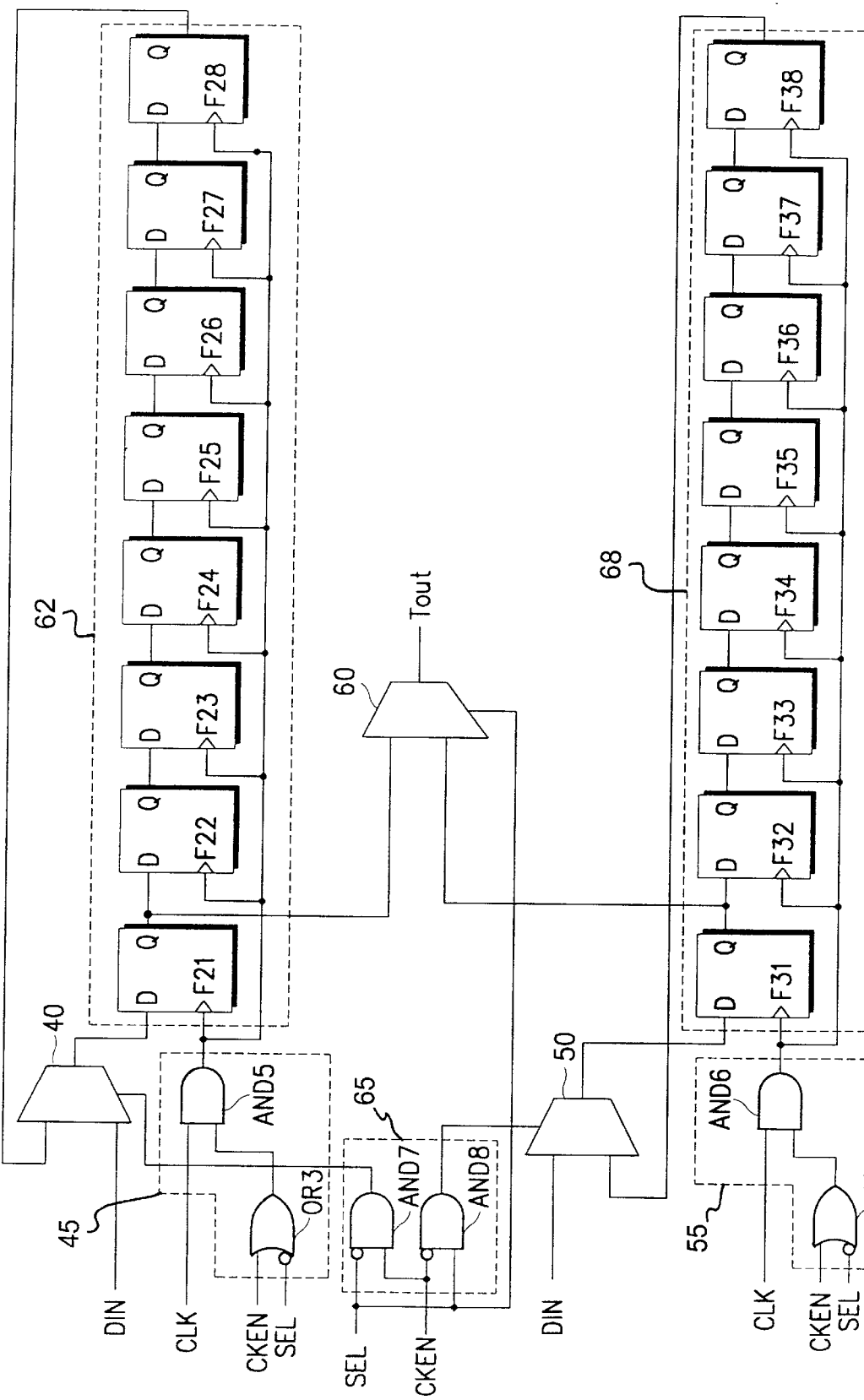
FIG. 3 is a block diagram of a device for converting low rate serial data into high rate serial data according to a preferred embodiment of the present invention.

FIG. 3 is a block diagram of a device for converting low rate serial data into high rate serial data according to a preferred embodiment of the present invention. This embodiment will be explained for the situation where that low rate serial data is inputted at 2 Mbit and high rate serial data is inputted at 8 Mbit. In FIG. 3, DIN denotes low rate input data, and CLK denotes a clock signal for converting the low rate input data signal into high rate data signal and latching the input data in a bit rate conversion part. Input signals applied to the conversion device include a selection signal SEL for selecting an output value and a clock enable signal CKEN for enabling the clock.

Referring to FIG. 3, a third OR gate OR3 receives clock enable signal CKEN and inverted selection signal SEL and logic-ORs them, and a fifth AND gate AND5 logic-ANDs the output signal of third OR gate OR3 and clock signal CLK. Third OR gate OR3 and fifth AND gate AND5 are referred to as "third clock application part 45" hereinafter. A seventh AND gate AND7 accepts clock enable signal CKEN and inverted selection signal SEL and logic-ANDs them, and an eighth AND gate AND8 logic-ANDs selection signal SEL and inverted clock enable signal CKEN. The output of seventh AND gate AND7 is coupled to the selection port of a fourth selector 40, and the output of eighth AND gate AND8 is coupled to the selection port of a fifth selector 50. Seventh AND gate AND7 and eighth AND gate AND8 are referred to as "second selection part 65" hereinafter. The output of fifth AND gate AND5 is applied to the clock port of each of eight D-flip flops F21, F22, F23, F24, F25, F26, F27 and F28, serially connected, which constitute a third bit rate conversion part 62. The output of the final D-flip flop F28 of the third bit rate conversion part 62 is applied to the first input port of fourth selector 40, and the second input port of selector 40 receives the low rate input data DIN.

The clock port of a fourth bit rate conversion part 68 receives the output signal of sixth AND gate AND6 which logic-ANDs clock signal CLK and the output signal of fourth OR gate OR4 logic-ORing clock enable signal CKEN and selection signal SEL. Fourth OR gate OR4 and sixth AND gate AND6 are referred to as "fourth clock application part 55" hereinafter. The fourth bit rate conversion part 68 consists of eight D-flip flops, serially connected. The first D-flip flop F31 of the fourth bit rate conversion part 68 is coupled to the second input port of sixth selector 60, and the output of the fourth bit rate conversion part 68 is applied to the second input port of fifth selector 50. The input data DIN is applied to the input port of fifth selector 50 and the output port of selector 50 is coupled to the input port of first D-flip flop F31 of the fourth bit rate conversion part 68.

Figure 4:
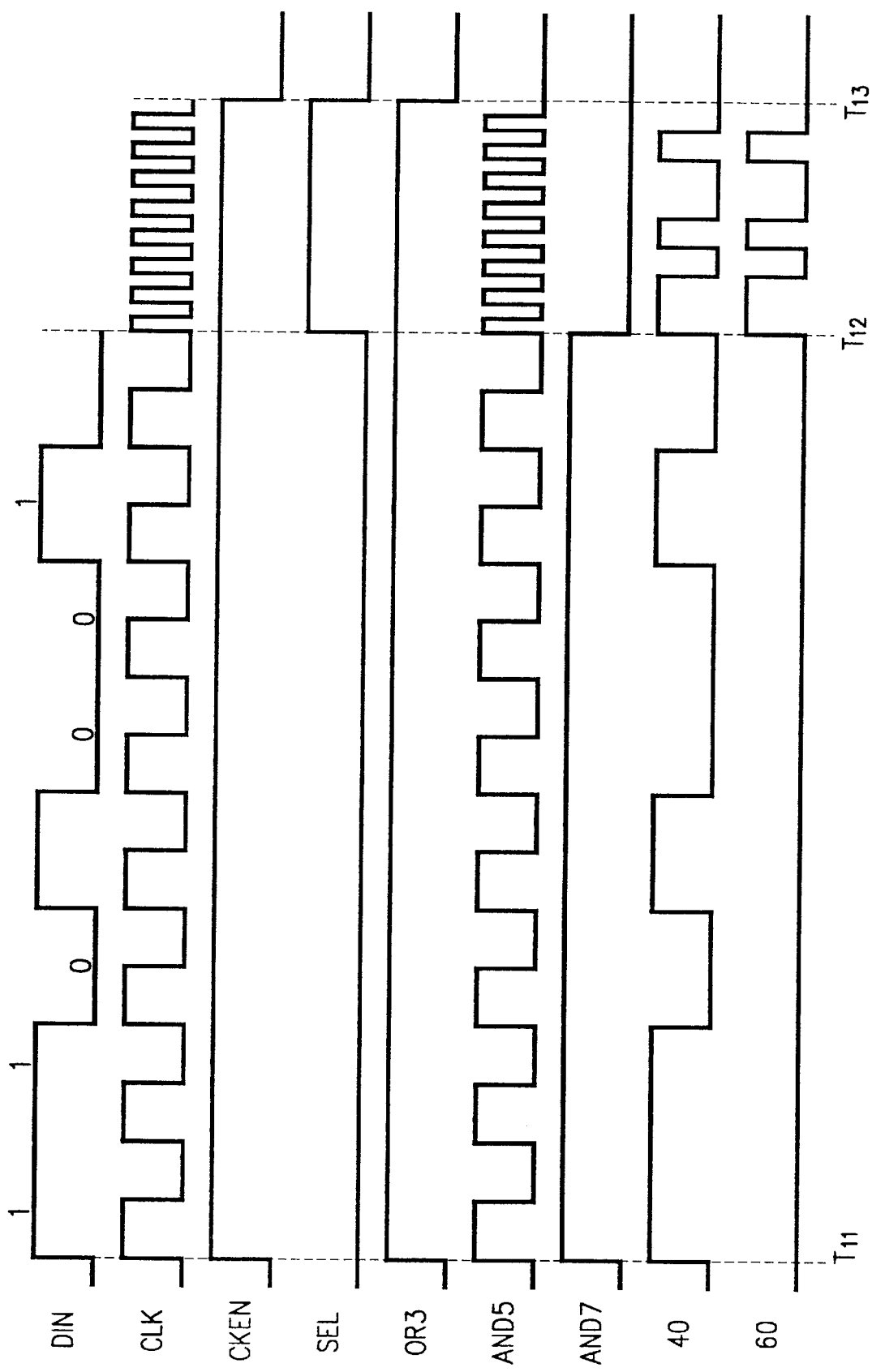
FIG. 4 illustrates the timing of principal parts of the conversion device of FIG. 3 according to the its operation.

The operation of the bit rate conversion device of FIG. 3 is explained below with reference to FIG. 4. FIG. 4 illustrate the timing of principal parts of the conversion device according to the its operation. It is assumed that the low rate input data is 11 01 00 10. The input data is applied to the fourth selector 40 with the timing shown in FIG. 4. With clock signal CLK, eight clocks are applied at the rate of 2 Mbit for a period of time ranging from the point of $T_{11}$ to the point of $T_{12}$, and another eight clocks are applied at 8 Mbit from the point of $T_{12}$ to the point of $T_{13}$. Clock enable signal CKEN is in the "HIGH" state for a period of time from $T_{11}$ to $T_{13}$, and selection signal SEL is in the "HIGH" state for a period of time from $T_{12}$ to $T_{13}$.

According to the input signals having the above timing, the output signal of third OR gate OR3 is in the "HIGH" state from the point of $T_{11}$ to the point of $T_{13}$, and it is logic-ANDed with clock signal CLK by fifth AND gate AND5. Fifth AND gate AND5 outputs a 2 Mbit clock for a period of time from $T_{11}$ to $T_{12}$, and outputs an 8 Mbit clock from the point of $T_{12}$ to the point of $T_{13}$. Seventh AND gate AND7 logic-ANDs clock enable signal CKEN and inverted selection signal SEL to output a signal which is in a "HIGH" state for a period of time from $T_{11}$ to $T_{12}$. Accordingly, fourth selector 40 sends the input data signal DIN to the third bit rate conversion part 62. The output signal of each of the D-flip flops constituting the third bit rate conversion part 62 is shown in the following Table 2.

TABLE 2

| Input clock | F11 | F12 | F13 | F14 | F15 | F16 | F17 | F18 |
|---|---|---|---|---|---|---|---|---|
| Initial state | 0 | 0 | 0 | 0 | 0 | 0 | 0 | 0 |
| 1st clock | 1 | 0 | 0 | 0 | 0 | 0 | 0 | 0 |
| 2nd clock | 1 | 1 | 0 | 0 | 0 | 0 | 0 | 0 |
| 3rd clock | 0 | 1 | 1 | 0 | 0 | 0 | 0 | 0 |
| 4th clock | 1 | 0 | 1 | 1 | 0 | 0 | 0 | 0 |
| 5th clock | 0 | 1 | 0 | 1 | 1 | 0 | 0 | 0 |
| 6th clock | 0 | 0 | 1 | 0 | 1 | 1 | 0 | 0 |
| 7th clock | 1 | 0 | 0 | 1 | 0 | 1 | 1 | 0 |
| 8th clock | 0 | 1 | 0 | 0 | 1 | 0 | 1 | 1 |
| 9th clock | 1 | 0 | 1 | 0 | 0 | 1 | 0 | 1 |
| 10th clock | 1 | 1 | 0 | 1 | 0 | 0 | 1 | 0 |
| 11th clock | 0 | 1 | 1 | 0 | 1 | 0 | 0 | 1 |
| 12th clock | 1 | 0 | 1 | 1 | 0 | 1 | 0 | 0 |
| 13th clock | 0 | 1 | 0 | 1 | 1 | 0 | 1 | 0 |
| 14th clock | 0 | 0 | 1 | 0 | 1 | 1 | 0 | 1 |
| 15th clock | 1 | 0 | 0 | 1 | 0 | 1 | 1 | 0 |
| 16th clock | 0 | 1 | 0 | 0 | 1 | 0 | 1 | 1 |

As shown in Table 2, the first clock to the eighth clock correspond to 2 Mbit low rate clocks, and the ninth to sixteenth clocks correspond to 8 Mbit high rate clocks. Thus, the bit rate of the data outputted from the third bit rate conversion part 62 for the period of time from the first to eighth clocks is different from that for the period of time from the ninth to sixteenth clocks. Sixth selector 60 outputs a signal having the timing shown in FIG. 4 from the point of $T_{12}$ to the point of $T_{13}$ while selection signal SEL is in the "HIGH" state. Accordingly, the low rate input serial data is converted into high rate serial data.

As described above, according to the present invention, low rate or high rate serial data can be directly converted into high rate or low rate serial data without converting it into parallel data, resulting in realization of a small-sized conversion device composed of a of small number of logic elements. Furthermore, data conversion is performed without delay, thereby increasing data processing speed.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A device for converting high rate serial data into low rate serial data, comprising:

first and second clock application parts for selectively generating a high rate clock and a low rate clock according to a selection signal;

a first bit rate conversion part for receiving and latching the high rate serial data according to the high rate clock from the first clock application part, and outputting the latched data at a low rate according to the low rate clock;

a second bit rate conversion part for receiving and latching the high rate serial data according to the high rate clock from the second clock application part, and outputting the latched data at a low rate according to the low rate clock;

a first selector for receiving an output of the first bit rate conversion part and the high rate serial data, and responsive to a first selection input for selectively outputting the output of the first bit rate conversion part and the high rate serial data;

a second selector for receiving an output of the second bit rate conversion part and the high rate serial data, and responsive to a second selection input for selectively outputting the output of the second bit rate conversion part and the high rate serial data;

a selection part for controlling outputting of the first and second selection inputs which are applied to the first and second selectors, respectively; and a third selector for receiving the outputs of the first and second bit rate conversion parts, and for sequentially outputting the high rate serial data in accordance with the low rate clock.

2. The device as claimed in claim 1, wherein each of the first and second bit rate conversion parts comprises a plurality of serially connected D-flip flops, an output of a final D-flip flop of the first bit rate conversion part being coupled to the first selector, and an output of a final D-flip flop of the second bit rate conversion part being coupled to the second selector.

3. The device as claimed in claim 2, wherein the selection part outputs a signal which is obtained by logic-ANDing a clock enable signal and an inverted selection signal to a selection port of the first selector, and outputs a signal obtained by logic-ANDing a selection signal and an inverted clock enable signal to a selection port of the second selector.

4. The device as claimed in claim 1, wherein the selection part outputs a signal which is obtained by logic-ANDing a clock enable signal and an inverted selection signal to a selection port of the first selector, and outputs a signal obtained by logic-ANDing a selection signal and an inverted clock enable signal to a selection port of the second selector.

5. A device for converting low rate serial data into high rate serial data, comprising:

first and second clock application parts for selectively generating a low rate clock and a high rate clock according to a selection signal;

a first bit rate conversion part for receiving and latching the low rate serial data according to the low rate clock from the first clock application part, and outputting the latched data at a high rate according to the high rate clock;

a second bit rate conversion part for receiving and latching the low rate serial data according to the low rate clock from the second clock application part, and outputting the latched data at a high rate according to the high rate clock;

a first selector for receiving an output of the first bit rate conversion part and the low rate serial data, and responsive to a first election input for selectively outputting the output of the first bit rate conversion part and the low rate serial data;

a second selector for receiving an output of the second bit rate conversion part and the low rate serial data, and responsive to a second selection input for selectively outputting the output of the second bit rate conversion part and the low rate serial data;

a selection part for controlling outputting of the first and second selection inputs which are applied to the first and second selectors, respectively; and a third selector for receiving the outputs of the first and second bit rate conversion parts, and for sequentially outputting the low rate serial data in accordance with the high rate clock.

6. The device as claimed in claim 5, wherein each of the first and second bit rate conversion parts comprises a plurality of serially connected D-flip flops, an output of a final D-flip flop of the first bit rate conversion part being coupled to the first selector, and an output of a final D-flip flop of the second rate conversion part being coupled to the second selector.

7. The device as claimed in claim 6, wherein the selection part outputs a signal which is obtained by logic-ANDing a clock enable signal and an inverted selection signal to a selection port of the first selector, and outputs a signal obtained by logic-ANDing a selection signal and an inverted clock enable signal to a selection port of the second selector.

8. The device as claimed in claim 5, wherein the selection part outputs a signal which is obtained by logic-ANDing a clock enable signal and an inverted selection signal to a selection port of the first selector, and outputs a signal obtained by logic-ANDing a selection signal and an inverted clock enable signal to a selection port of the second selector.

9. A method for converting high rate serial data into low rate serial data, comprising the steps of:

selectively generating a high rate clock and a low rate clock according to a selection signal;

performing a first bit rate conversion by latching the high rate serial data according to the high rate clock and outputting the latched data at a low rate according to the low rate clock to provide a first latched output;

performing a second bit rate conversion by latching the high rate serial data according to the high rate clock and outputting the latched data at a low rate according to the low rate clock to provide a second latched output;

selectively outputting the first latched output and the high rate serial data based on a first selection input;

selectively outputting the second latched output and the high rate serial data based on a second selection input; and receiving the first and second latched outputs and sequentially outputting the high rate serial data in accordance with the low rate clock.

10. The method as claimed in claim 9, further comprising the step of logic-ANDing a clock enable signal and an inverted selection signal to obtain the first selection input for controlling said step of selectively outputting the first latched output and the high rate serial data.

11. The method as claimed in claim 9, further comprising the step of logic-ANDing an inverted clock enable signal and a selection signal to obtain the second selection input for controlling said step of selectively outputting the second latched output and the high rate serial data.

12. A method for converting low rate serial data into high rate serial data, comprising the steps of:

selectively generating a low rate clock and a high rate clock according to a selection signal;

performing a first bit rate conversion by latching the low rate serial data according to the low rate clock and outputting the latched data at a high rate according to the high rate clock to provided a first latched output;

performing a second bit rate conversion by latching the low rate serial data according to the low rate clock and outputting the latched data at a high rate according to the high rate clock to provide a second latched output;

selectively outputting the first latched output and the low rate serial data based on a first selection input;

selectively outputting the second latched output and the low rate serial data based on a second selection input; and receiving the first and second latched outputs and sequentially outputting the low rate serial data in accordance with the high rate clock.

13. The method as claimed in claim 12, further comprising the step of logic-ANDing a clock enable signal and an inverted selection signal to obtain the first selection input for controlling said step of selectively outputting the first latched output and the low rate serial data.

14. The method as claimed in claim 12, further comprising the step of logic-ANDing an inverted clock enable signal and a selection signal to obtain the second selection input for controlling said step of selectively outputting the second latched output and the low rate serial data.

15. The device as claimed in claim 1, wherein said first selector has a first input connected to an output of the first bit rate conversion part for receiving an output thereof.

16. The device as claimed in claim 15, wherein the first selector has a second input for receiving the high rate serial data.

17. The device as claimed in claim 16, wherein the first selector has an output connected to an input of the first bit rate conversion part.

18. The device as claimed in claim 15, wherein the first selector has an output connected to an input of the first bit rate conversion part.

19. The device as claimed in claim 1, wherein said second selector has a first input connected to an output of the second bit rate conversion part for receiving an output thereof.

20. The device as claimed in claim 19, wherein the second selector has a second input for receiving the high rate serial data.

21. The device as claimed in claim 20, wherein the second selector has an output connected to an input of the second bit rate conversion part.

22. The device as claimed in claim 19, wherein the second selector has an output connected to an input of the second bit rate conversion part.

23. The device as claimed in claim 2, wherein the third selector has a first input connected to an output of a first D-flip flop of the first bit rate conversion part, and has a second input connected to an output of a first D-flip flop of the second bit rate conversion part.

24. The device as claimed in claim 5, wherein said first selector has a first input connected to an output of the first bit rate conversion part for receiving an output thereof.

25. The device as claimed in claim 24, wherein the first selector has a second input for receiving the low rate serial data.

26. The device as claimed in claim 25, wherein the first selector has an output connected to an input of the first bit rate conversion part.

27. The device as claimed in claim 24, wherein the first selector has an output connected to an input of the first bit rate conversion part.

28. The device as claimed in claim 5, wherein said second selector has a first input connected to an output of the second bit rate conversion part for receiving an output thereof.

29. The device as claimed in claim 19, wherein the second selector has a second input for receiving the low rate serial data.

30. The device as claimed in claim 29, wherein the second selector has an output connected to an input of the second bit rate conversion part.

31. The device as claimed in claim 28, wherein the second selector has an output connected to an input of the second bit rate conversion part.

32. The device as claimed in claim 23, wherein the third selector has a first input connected to an output of a first D-flip flop of the first bit rate conversion part, and has a second input connected to an output of a first D-flip flop of the second bit rate conversion part.

* * * * *